(12) United States Patent
Nishitani

(10) Patent No.: US 10,008,959 B2
(45) Date of Patent: Jun. 26, 2018

(54) DRIVING APPARATUS AND LENS DRIVING APPARATUS HAVING THE SAME

(71) Applicant: CANON KABUSHIKI KAISHA, Tokyo (JP)

(72) Inventor: Hitoshi Nishitani, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 358 days.

(21) Appl. No.: 14/903,543

(22) PCT Filed: Jul. 9, 2014

(86) PCT No.: PCT/JP2014/068843
§ 371 (c)(1),
(2) Date: Jan. 7, 2016

(87) PCT Pub. No.: WO2015/005494
PCT Pub. Date: Jan. 15, 2015

(65) Prior Publication Data
US 2016/0164436 A1  Jun. 9, 2016

(30) Foreign Application Priority Data

Jul. 10, 2013 (JP) ................................. 2013-144277
Jul. 1, 2014 (JP) ................................. 2014-135845

(51) Int. Cl.
*H02N 2/10* (2006.01)
*G02B 7/04* (2006.01)
(Continued)

(52) U.S. Cl.
CPC ............. *H02N 2/103* (2013.01); *G02B 7/023* (2013.01); *G02B 7/04* (2013.01); *H02N 2/0015* (2013.01); *H02N 2/026* (2013.01); *H02N 2/12* (2013.01)

(58) Field of Classification Search
CPC ........................................................ H02N 2/103
(Continued)

(56) References Cited

U.S. PATENT DOCUMENTS

2014/0300977 A1* 10/2014 Yamasaki ............. H02N 2/103
359/824

FOREIGN PATENT DOCUMENTS

CN        101222189 A       7/2008
JP        06-311765 A       11/1994
(Continued)

OTHER PUBLICATIONS

PCT/IB/326 (PCT Notification Concerning Transmittal of International Preliminary Report on Patentability).
(Continued)

*Primary Examiner* — James Jones
(74) *Attorney, Agent, or Firm* — Cowan, Liebowitz & Latman, P.C.

(57) ABSTRACT

A driving apparatus has a vibration plate, a vibrator having a piezoelectric element that excites vibration of the vibration plate, and first and second contact parts, and a friction member being in contact with the contact parts. The vibrator and the friction member relatively move with respect to each other, and the contact parts are provided at positions with and interpose an odd number of antinodal lines of vibration generated in a first direction of the vibrator along with excitation, and provided at positions with and interpose an odd number of nodal lines of vibration generated in a second direction of the vibrator along with excitation.

22 Claims, 12 Drawing Sheets

(51) Int. Cl.
  *H02N 2/00* (2006.01)
  *H02N 2/02* (2006.01)
  *G02B 7/02* (2006.01)
  *H02N 2/12* (2006.01)

(58) Field of Classification Search
  USPC ........................................................ 359/824
  See application file for complete search history.

(56) References Cited

FOREIGN PATENT DOCUMENTS

| | | |
|---|---|---|
| JP | 09-205782 A | 8/1997 |
| JP | 09205782 A | 8/1997 |
| JP | 2006-014534 A | 1/2006 |
| JP | 2008-072785 A | 3/2008 |
| JP | 2008-172930 A | 7/2008 |
| JP | 2012-016107 A | 1/2012 |

OTHER PUBLICATIONS

PCT/IB/373 (PCT International Preliminary Report on Patentability).
PCT/ISA/237 (PCT Written Opinion of the International Searching Authority).
The above foreign patent documents were cited in a Dec. 5, 2016 Chinese Office Action, a copy of which is enclosed with an English Translation, that issued in Chinese Patent Application No. 201480039367.2.
The above foreign patent documents 2-5 were cited the International Search Report dated Oct. 21, 2014 of PCT/JP2014/068843 dated Jul. 9, 2014, which is enclosed.

\* cited by examiner

FIG. 6A
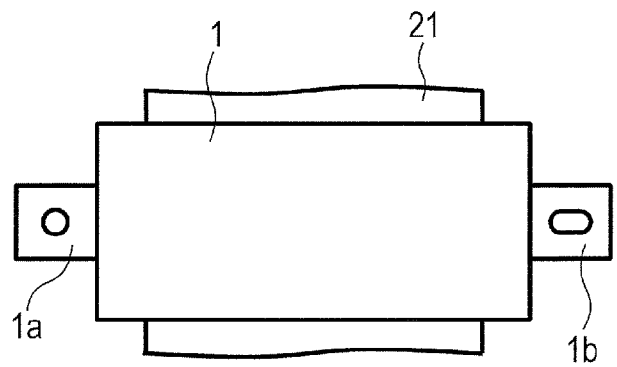
FIG. 6C     FIG. 6B     FIG. 6D
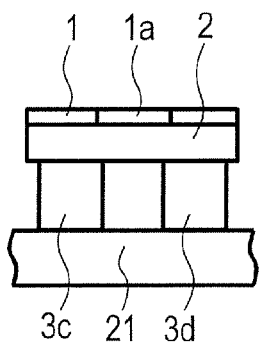 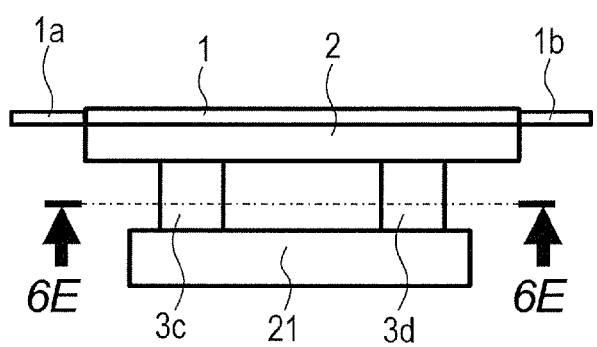 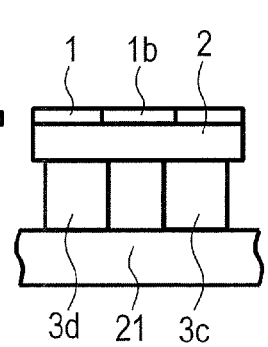
FIG. 6E
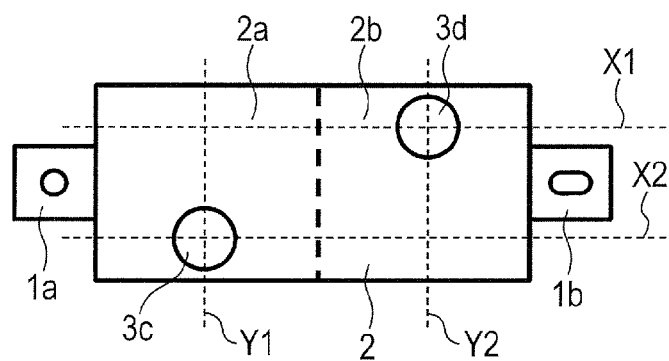

FIG. 7A
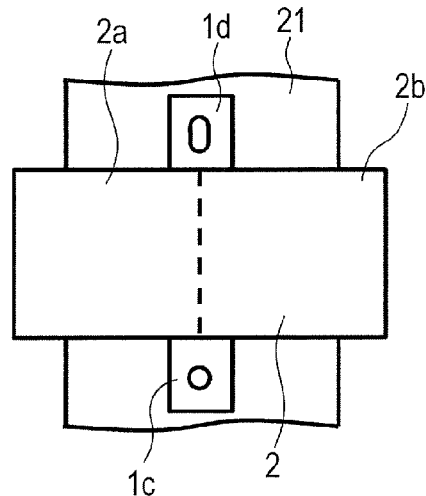
FIG. 7C    FIG. 7B    FIG. 7D
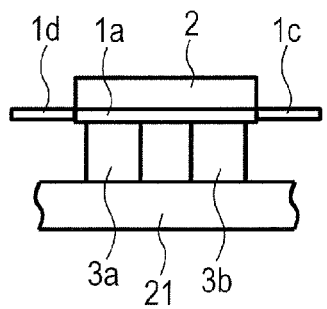 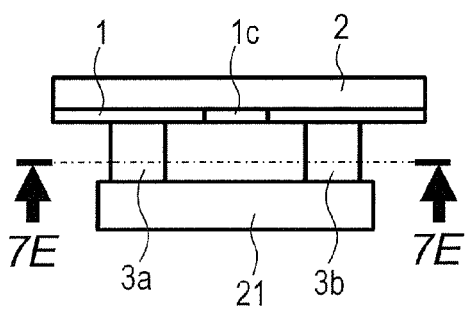 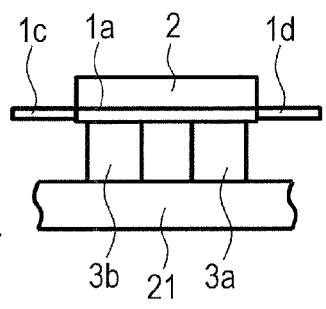
FIG. 7E
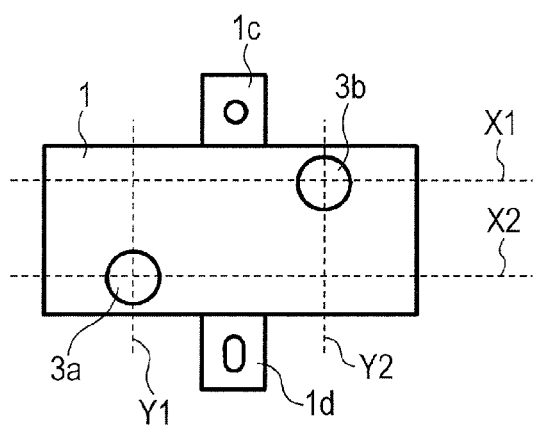

DRIVING APPARATUS AND LENS DRIVING APPARATUS HAVING THE SAME

CROSS-REFERENCE TO RELATED APPLICATIONS

This application claims priority to International Application No. PCT/JP2014/068843 filed on Jul. 9, 2014, the entire disclosure of which is hereby incorporated by reference.

TECHNICAL FIELD

The present invention relates to a linear driving ultrasonic motor as a driving apparatus, which has an elastic body constituting a plate-like vibrator. In particular, the present invention relates to a lens driving apparatus using the ultrasonic motor.

BACKGROUND ART

Hitherto, as the linear driving ultrasonic motor as a driving apparatus, there have been various inventions made, and for example, PTL 1 or PTL 2 discloses an ultrasonic motor.

PTL 1 describes an example where the amplitudes of two different kinds of bending vibration having the substantially same natural frequency are extracted to the distal ends of projections for driving.

PTL 2 is an improvement of the invention of PTL 1, and describes an example where driving is made by a piezoelectric element with a simple configuration.

A vibrator for use in an ultrasonic motor of the related art will be described referring to FIGS. 8A to 8E. FIGS. 8A to 8E illustrate a configuration of a vibrator for use in an ultrasonic motor of PTL 2. FIG. 8A is a plan view, FIG. 8B is a front view of FIG. 8A, FIG. 8C is a left side view of FIG. 8A, FIG. 8D is a right side view of FIG. 8A, and FIG. 8E is a sectional view taken along the line 8E-8E of FIG. 8B.

The vibrator has a vibration plate 101 having a rectangular shape, and holing parts 101a and 101b which are provided on the shorter sides of the vibration plate 101 for holing to a retention member (not shown). The vibrator further has two projections 103a and 103b which are bonded to the vibration plate 101, and a piezoelectric element 102 which is bonded to a rear surface of a surface to which the projections 103a and 103b of the vibration plate 101 are bonded. The piezoelectric element 102 is polarized into two phases of an A phase 102a and a B phase 102b.

The projection 103a is bonded to a place of an antinode X3 of a primary natural vibration mode of bending vibration excited by the piezoelectric element 102 and generated in a direction along the shorter side of the vibration plate 101. The projection 103a is also bonded to a place of one node Y3 of a secondary natural vibration mode of bending vibration excited by the piezoelectric element 102 and generated in a direction along the longer side of the vibration plate 101. The projection 103b is bonded to the place of the antinode X3 of the primary natural vibration mode of bending vibration generated in the direction along the shorter side of the piezoelectric element 102. The projection 103b is also bonded to a place of the other node Y4 of the secondary natural vibration mode of bending vibration generated in the direction along the longer side. The two projections 103a and 103b are in contact with a friction member 201 fixed to a fixed frame (not shown) on a surface opposite to the bonding surface to the vibration plate 101. In the above-described configuration, an AC voltage is applied from power feed means (not shown) to the A phase 102a and the B phase 102b of the piezoelectric element 102 while changing a phase difference in a range of −90° to +90°. With this, ultrasonic vibration is generated, and a driving force for relative movement of the vibrator and the friction member 201 is generated.

Subsequently, a mode of the vibrator when an AC voltage having a phase difference is applied to the A phase 102a and the B phase 102b of the piezoelectric element 102 will be described referring to FIGS. 9 and 10.

FIG. 9 models and illustrates a mode of the vibrator when an AC voltage is applied while delaying the phase of the B phase 102b by about +90° with respect to the A phase 102a of the piezoelectric element 102. The piezoelectric element 102 and the holding parts 101a and 101b are omitted. The (a) of FIG. 9 illustrates changes in the AC voltage which is applied to the A phase 102a and the B phase 102b of the piezoelectric element 102, and in the (a) of FIG. 9, the vertical axis represents a voltage and the horizontal axis represents time. A voltage V5 is applied to the A phase, and a voltage V6 is applied to the B phase. The (b) of FIG. 9 is a front view of the vibrator, the (c) of FIG. 9 is a left side view of the vibrator at the bonding position of the left projection 103a of the vibrator, and the (d) of FIG. 9 is a right side view of the vibrator at the bonding position of the right projection 103b of the vibrator in the (b) to (d) of FIG. 9, state change in vibration of the vibrator at the time T9 to the time T12 of the (a) of FIG. 9 is indicated by a solid line. A dotted line indicates the state of the vibrator other than at the time indicated by the solid line for comparison.

FIG. 10 models and illustrates a mode of the vibrator when an AC voltage having no substantial phase difference is applied between the A phase 102a and the B phase 102b of the piezoelectric element 102. The piezoelectric element 102 and the holing parts 101a and 101b are omitted. The (a) of FIG. 10 illustrates changes in the AC voltage which is applied to the A phase 102a and the B phase 102b of the piezoelectric element 102, and in the (a) of FIG. 10, the vertical axis represents a voltage and the horizontal axis represents time. A voltage V7 is applied to the A phase, and a voltage V8 is applied to the B phase. The (b) of FIG. 10 is a front view of the vibrator, the (c) of FIG. 10 is a left side view of the vibrator at the bonding position of the left projection 103a of the vibrator, and the (d) of FIG. 10 is a right side view of the vibrator at the bonding position of the right projection 103b of the vibrator. In the (b) to (d) of FIG. 10, state change in vibration of the vibrator at the time T13 to the time T16 of the (a) of FIG. 10 is indicated by a solid line. A dotted line indicates the state of the vibrator other than at the time represented by the solid line for comparison.

As in FIG. 9, when an AC voltage is applied while delaying the phase of the B phase 102b by about +90° with respect to the A phase 102a of the piezoelectric element 102, at the time T10 and the time T12, as in the (a) of FIG. 9, voltages of the same sign having the same magnitude are applied to the A phase 102a and the B phase 102b. At this time, as in the (c) and (d) of FIG. 9, the A phase 102a and the B phase 102b the most expand and contract in the same direction within the same plane. The amplitude of the primary bending vibration generated in the direction along the shorter side of the vibration plate 101 becomes a maximum (P5). Accordingly, as in the (c) and (d) of FIG. 9, this place becomes the antinode X3 of the primary natural vibration mode of bending vibration generated in the direction along the shorter side of the vibration plate 101.

At the time T9 and the time T11, as in the (a) of FIG. 9, voltages of different signs having the same magnitude are applied to the A phase 102a and the B phase 102b of the piezoelectric element 102. At this time, as in the (b) of FIG. 9, the A phase 102a and the B phase 102b the most expand and contract in opposite directions within the same plane. The amplitude of the secondary bending vibration generated in a direction along the longer side of the vibration plate 101 becomes a maximum (P6). Accordingly, as in the (b) of FIG. 9, this place becomes the antinode of the secondary natural vibration mode of the bending vibration generated in the direction along the longer side of the vibration plate 101. The place where the projection 103a is arranged becomes the node Y3 of the primary natural vibration mode of bending vibration generated in the direction along the shorter side of the vibration plate 101, and the place where the projection 103b is arranged becomes the node Y4 of the primary natural vibration mode of bending vibration generated in the direction along the shorter side of the vibration plate 101.

As a result, since a circular motion R5 is generated at the distal end of the projection 103a and a circular motion R6 is generated a the distal end of the projection 103b, the vibrator obtains a driving force to move in an Xd direction with respect to the friction member 201. When an AC voltage is applied while delaying the phase of the A phase 102a by about +90° with respect to the B phase 102b, since a circular motion in a direction opposite to the circular motion R5 is generated, the vibrator obtains a driving force to move in a direction opposite to the Xd direction with respect to the friction member 201.

As in FIG. 10, when an AC voltage having no substantial phase difference is applied between the A phase and the B phase of the piezoelectric element, at the time T14 and the time T16, as in the (a) of FIG. 10, voltages of the same sign having the same magnitude are applied to the A phase 102a and the B phase 102b of the piezoelectric element 102. At this time, as in the (c) and (d) of FIG. 10, the A phase 102a and the B phase 102b the most expand and contract in the same direction within the same plane. The amplitude of the primary bending vibration generated in the direction along the shorter side of the vibration elate 101 becomes a maximum (P7). Accordingly, as in the (c) and (d) of FIG. 10, this place becomes the antinode X3 of the primary natural vibration mode of bending vibration generated in the direction along the shorter side of the vibration plate 101.

At the time T13 and the time T15, compared to a case where an AC voltage is applied while delaying the phase of the B phase 102b by about +90° with respect to the A phase 102a of the piezoelectric element 102 (FIG. 9), as in the (a) of FIG. 10, the time when voltages of different signs are applied between the A phase 102a and the B phase 102b is very short. Accordingly, as in the (b) of FIG. 10, the secondary bending vibration generated in the direction along the longer side of the vibration plate 101 becomes small compared to a case where an AC voltage is applied while delaying the phase of the B phase 102b by about +90° with respect to the A phase 102a (P8). Therefore, as in the (b) of FIG. 10, this place becomes the antinode of the secondary natural vibration mode of bending vibration generated in the direction along the longer side of the vibration plate 101. The place where the projection 103a is arranged becomes the node Y3 of the primary natural vibration mode of bending vibration in the direction along the shorter side of the vibration plate 101, and the place where the projection 103b is arranged becomes the node Y4 of the primary natural vibration mode of bending vibration generated in the direction along the shorter side of the vibration plate 101.

As a result, since a longitudinal elliptic motion R7 is generated at the distal end of the projection 103a and a longitudinal elliptic motion R8 is generated at the distal end of the projection 103b, the vibrator can obtain a driving force to move in the Xd direction with respect to the friction member 201 at low speed. Similarly to the circular motion R5, a driving force for moving in an opposite direction can be obtained.

In this way, the ultrasonic motor of the related art controls the phase difference of the AC voltage which is applied to the A phase 102a and the B phase 102b of the piezoelectric element 102, thereby changing the elliptical ratio of the motion of the distal end of the projection to correspond to a wide speed range.

CITATION LIST

Patent Literature

PTL 1: Japanese Patent Application Laid-Open No. H06-311765
PTL 2: Japanese Patent Application Laid-Open No. 2012-16107

SUMMARY OF INVENTION

Technical Problem

In recent years, there is an increasing demand for reduction in size of an electronic apparatus in which an ultrasonic motor is mounted, and in particular, reduction in size of a lens driving apparatus. In the ultrasonic motors of PTL 1 and PTL 2, reduction in size is achieved, however, with limitations.

A driving apparatus which uses an ultrasonic motor of the related art will be described referring to FIGS. 11A, 11B, and 12A to 12C.

FIGS. 11A and 11B are schematic views of a linear driving apparatus which uses an ultrasonic motor having the vibrator of PTL 2 and illustrated in FIGS. 8A to 8E. FIG. 11A is a diagram when viewed from a direction in which a vibrator and a friction member in the ultrasonic motor relatively move, and FIG. 11B is a sectional view taken along the line 11B-11B of FIG. 11A.

FIGS. 12A to 12C are schematic views of a lens driving apparatus in which a linear driving apparatus, which uses an ultrasonic motor having a vibrator of PTL 2, is mounted. FIG. 12A is a front view when a lens apparatus is viewed from an optical axis direction of a lens driving apparatus, and FIG. 12B is an internal side view of the inside of the lens driving apparatus when the full length in the optical axis direction of the lens driving apparatus is long. FIG. 12C is an internal side view of the inside of the lens driving apparatus when the full length in the optical axis direction of the lens driving apparatus is short.

A linear driving apparatus 200 has a vibrator, a friction member 201, a roller 202, a roller support shaft 202a, and a frame body 203 as a retention member. The linear driving apparatus 200 further has a roller support part 203a which is retained by the frame body 203, a pressurization spring 204, holding pins 205 which are retained by the frame body 203, and a driving transmission member 206 which is fixed to the frame body 203.

The lens driving apparatus has the linear driving apparatus 200, an outer frame 301, a lens 302, a lens holder 303 which retains the lens 302, guide bars 304 and 305. In FIGS. 12B and 12C, in order to clarify the position relationship of the vibration plate 101 with respect to the size of the lens driving apparatus, in the linear driving apparatus 200, other parts than the vibration plate 101 and the projections 103a and 103b are omitted.

In the linear driving apparatus 200, holding pins 205 are fitted into the holes of the holding parts 101a and 101b of the vibration plate, and the vibrator is supported by the frame body 203. The roller 202 is supported by the frame body 203 through the roller support shaft 202a supported by the roller support part 203a. The sliding surface of the roller 202 is in contact with the friction member 201 fixed to the outer frame 301 of the lens driving apparatus. The pressurization spring 204 has a lower end in contact with the piezoelectric element 102 of the vibrator and an upper end in contact with the frame body 203, and is sandwiched between the piezoelectric element 102 and the frame body 203 to give a pressurization force to the piezoelectric element 102 and the frame body 203. The vibrator has a free motion in the central axis direction of the pressurization spring 204, and the projections 103a and 103b are in contact with the surface of the friction member 201 opposite to a roller contact surface. Accordingly, the projections 103a and 103b are pressurized and brought into contact with the friction member 201 by the pressurization force of the pressurization spring 204. With the circular motions (or elliptic motions) Rb and Rc generated in the projections 103a and 103b, the vibrator obtains a driving force to move in an Xe direction with respect to the friction member 201. As described above, it is possible to change the phase difference in the AC voltage which is applied to the A phase 102a and the B phase 102b of the piezoelectric element 102. With this, circular motions in a direction opposite to the circular motions Rb and Rc are generated, and the vibrator obtains a driving force to move in a direction opposite to the Xe direction with respect to the friction member 201.

In the lens driving apparatus, the guide bars 304 and 305 and the friction member 201 have both ends fixed to the outer frame 301 to extend in the optical axis direction of the lens driving apparatus. The lens holder 303 is connected to the driving transmission member 206 of the linear driving apparatus 200. The lens holder 303 is supported by the guide bars 304 and 305 and guided, and can move in an optical axis direction Xf of a lens apparatus. The linear driving apparatus 200 moves at a considerable distance according to a movement command from a control unit (not shown), thereby moving the lens holder 303. The vibration plate 101 of the vibrator in FIG. 12B moves within a range of a product of a lens holder moving distance L4 between one movable end K and the other movable end L of the lens holder 303 and a vibration plate length L5, which is the length in the moving direction of the vibration plate 101. Accordingly, in order to achieve reduction in size of the entire apparatus, reduction in the vibration plate length L5 is indispensable. When the lens holder moving distance L4 is sufficiently greater than the vibration plate length L5, reduction in the vibration plate length L5 rarely leads to reduction in size of the entire apparatus compared to reduction in the lens holder moving distance L4. Meanwhile, in a lens driving apparatus of FIG. 12C which is further reduced in size, the vibration plate length L5 may be longer than the lens holder moving distance L4 between one movable end M and the other movable end N of the lens holder 303. In this case, in particular, reduction in the vibration plate length L5 of the vibration plate 101 becomes a major issue for reduction in the size of the entire apparatus. However, reduction in the vibration plate length L5 has the following problem.

In the ultrasonic motor of PTL 2, the vibration plate 101 has the vibration plate length L5 which is the length of the longer side in a direction, in which the vibrator relatively moves with respect to the friction member 201. For this reason, if the vibration plate length L5 is merely reduced, there is a problem in that the amplitude of bending vibration decreases simultaneously, and the driving force is degraded or the driving force is not obtained. Accordingly, in the ultrasonic motor of PTL 2, there is a limit to reduction in the vibration plate length L5.

As described in PTL 1, if a piezoelectric element having a complex polarized structure is used, even when the vibration plate length L5 is reduced, it is possible to maintain the driving force. Meanwhile, there is a problem in that cost of the piezoelectric element increases, power feed means becomes complicated, power consumption increases, and the like.

Solution to Problem

A driving apparatus of the invention includes a vibration plate, a vibrator having a piezoelectric element that excites vibration of the vibration plate, and first and second contact parts, and a friction member being in contact with the first contact part and the second contact part. The vibrator and the friction member relatively move with respect to each other, and the first contact part and the second contact part are provided at positions with and interpose an odd number of antinodal lines of vibration generated in a first direction of the vibrator along with excitation, and provided at positions with and interpose an odd number of nodal lines of vibration generated in a second direction of the vibrator along with excitation.

Advantageous Effects of Invention

With the above-described means, the driving apparatus of the invention can attain reduction in size of a vibrator in a moving direction with respect to a friction member with a simple configuration of a piezoelectric element, and a small lens driving apparatus using the ultrasonic motor can be provided.

Further features of the present invention will become apparent from the following description of exemplary embodiments with reference to the attached drawings.

BRIEF DESCRIPTION OF DRAWINGS

FIG. 6A is a plan view illustrating a configuration of a vibrator of an ultrasonic motor according to Embodiment 2 of the invention.

FIG. 6B is a front view illustrating the configuration of the vibrator of the ultrasonic motor of FIG. 6A.

FIG. 6C is a left side view illustrating the configuration of the vibrator of the ultrasonic motor of FIG. 6A.

FIG. 6D is a right side view illustrating the configuration of the vibrator of the ultrasonic motor of FIG. 6A.

FIG. 6E is a partial sectional view illustrating the configuration of the vibrator of the ultrasonic motor of FIG. 6A.

FIG. 7A is a plan view illustrating a configuration of a vibrator of an ultrasonic motor according to Embodiment 3 of the invention.

FIG. 7B is a front view illustrating the configuration of the vibrator of the ultrasonic motor of FIG. 7A.

FIG. 7C is a left side view illustrating the configuration of the vibrator of the ultrasonic motor of FIG. 7A.

FIG. 7D is a right side view illustrating the configuration of the vibrator of the ultrasonic motor of FIG. 7A.

FIG. 7E is a partial sectional view illustrating the configuration of the vibrator of the ultrasonic motor of FIG. 7A.

DESCRIPTION OF EMBODIMENTS

Figure 1A:
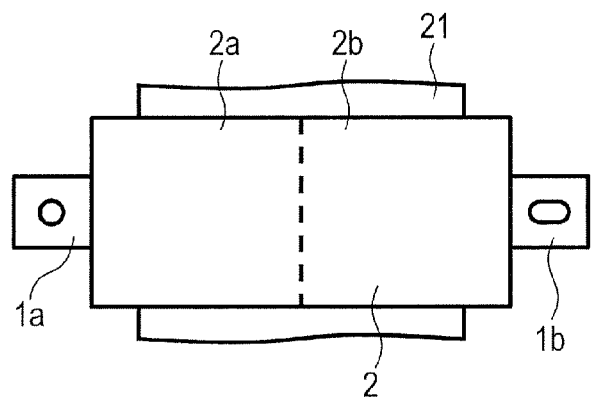
FIG. 1A is a plan view illustrating a configuration of a vibrator of an ultrasonic motor according to Embodiment 1 of the invention.

Preferred embodiments of the present invention will now be described in detail in accordance with the accompanying drawings.

Embodiment 1

Hereinafter, Embodiment 1 for carrying out the invention will be described. In the drawings, the same members are represented by the same symbols.

Figure 1C:
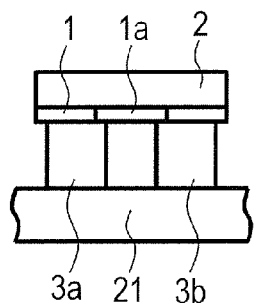
FIG. 1C is a left side view of the configuration of the vibrator of the ultrasonic motor of FIG. 1A.
Figure 1B:
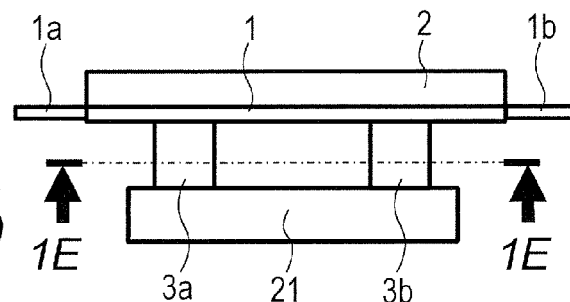
FIG. 1B is a front view illustrating the configuration of the vibrator of the ultrasonic motor of FIG. 1A.
Figure 1D:
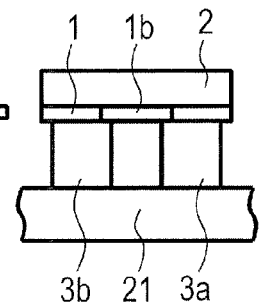
FIG. 1D is a right side view of the configuration of the vibrator of the ultrasonic motor of FIG. 1A.
Figure 1E:
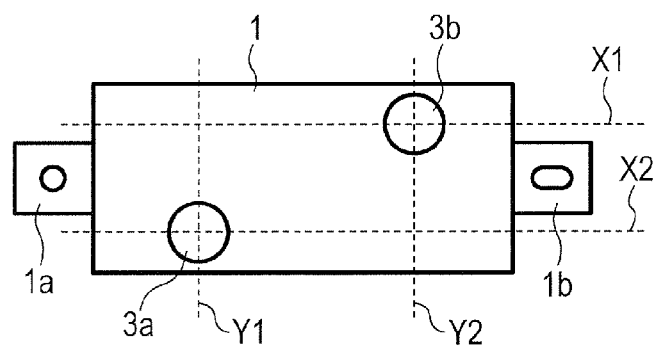
FIG. 1E is a partial sectional view of the configuration of the vibrator of ultrasonic motor of FIG. 1A.

A vibrator for use in an ultrasonic motor as a driving apparatus according to Embodiment 1 of the invention will be described referring to FIGS. 1A to 1E. FIGS. 1A to 1E illustrate a configuration of a vibrator of the ultrasonic motor according to Embodiment 1. FIG. 1A is a plan view, FIG. 1B is a front view of FIG. 1A, FIG. 1C is a left side view of FIG. 1A, FIG. 1D is a right side view of FIG. 1A, and FIG. 1E is a sectional view taken along the line 1E-1E of FIG. 1B.

The ultrasonic motor of this embodiment includes a vibrator, projections 3a and 3b as a contact part, and a friction member 21 which comes into contact with the projections 3a and 3b.

The vibrator has a vibration plate 1, and a piezoelectric element 2 attached to the vibration plate 1. The vibration plate 1 is a plate material which has a polygonal shape including longer sides and shorter sides, representatively, a rectangular shape. The piezoelectric element 2 is polarized into two phases of an A phase 2a and a B phase 2b, and generates high frequency vibration. The vibrator has holding parts 1a and 1b on the shorter sides of the vibration plate 1, and is held to, for example, a retention member.

The projections 3a and 3b are formed and disposed on a rear surface of a surface on which the piezoelectric element 2 is attached to the vibration plate 1. The projections 3a and 3b are convex shape parts and are in contact with the friction member 21 on a surface opposite to a surface connected to the vibration plate 1. The friction member 21 is fixed to an immovable fixed frame (not shown), and the vibrator relatively moves along the fixed friction member 21. The projections 3a and 3b may be formed integrally with the vibration plate 1, and for example, integral formation corresponds to drawing.

The projection 3a is arranged at a place of one node (nodal line) X2 of a resonance frequency of a primary natural vibration mode of bending vibration excited by the piezoelectric element 2 and generated in a direction (first direction) along the shorter side of the vibration plate 1. The projection 3a as a first contact part is also arranged at a place of an antinode (antinodal line) Y1 of a resonance frequency of a secondary natural vibration mode of bending vibration excited by the piezoelectric element 2 and generated in a direction (second direction) along the longer side of the vibration plate 1 orthogonal to the direction along the shorter side of the vibration plate 1. The projection 3b as a second contact part is arranged at a place of the other node (nodal line) X1 of the resonance frequency of the primary natural vibration mode of bending vibration generated in the direction along the shorter side of the vibration plate 1. The projection 3b is also arranged at a place of the other antinode (antinodal line) Y2 of the resonance frequency of the secondary natural vibration mode of bending vibration generated in the direction along the longer side of the vibration plate 1. That is, the contact parts 3a and 3b are provided at positions with and interpose an odd number of antinodal lines of vibration generated in the shorter side of the vibration plate 1 along with the excitation of the piezoelectric element 2, and provided at positions with and interpose an odd number of nodal lines of vibration generated in the direction along the longer side of the vibration plate 1 along with the excitation of the piezoelectric element 2. The contact parts 3a and 3b are provided at the opposite positions with and interpose an antinodal line or the primary bending vibration generated in the direction along the shorter side of the vibration plate 1, and the contact parts 3a and 3b are provided at different positions in the direction along the longer side of the vibration plate 1 other than positions of nodal lines of the secondary bending vibration generated in the direction along the longer side of the vibration plate 1. An AC voltage is applied by power feed means (not shown) to the A phase 2a and the B phase 2b of the piezoelectric element 2 while changing the phase difference from +90° to +270°, thereby generating ultrasonic vibration. The resonance frequency of the primary natural vibration mode and the resonance frequency of the secondary natural vibration mode may match each other or may be adjacent to each other. There may not be a resonance frequency of a different vibration mode between the resonance frequency of the primary natural vibration mode and the resonance frequency of the secondary natural vibration mode.

In this example, an example where the contact parts 3a and 3b are at the positions with and interpose one (odd number) antinodal line of the primary bending vibration generated in the direction along the shorter side of the vibration plate 1 has been described. However, for example, a case where the contact parts 3a and 3b are at positions with and interpose one (odd number) antinodal line of the two antinodal lines of the secondary bending vibration, a case where the contact parts 3a and 3b are at positions with and interpose one (odd number) of three antinodal lines of tertiary bending vibration or three (odd number) antinodal lines, or the like is also considered.

In this example, an example where the contact parts 3a and 3b are at positions with and interpose one (odd number) central nodal line of three nodal lines of the secondary bending vibration generated in the direction along the longer side of the vibration plate 1 has been described. However, for example, a case where the contact parts 3a and 3b are at positions with and interpose one (odd number) other than the central nodal line of the three nodal lines of the secondary bending vibration or three (odd number) nodal lines, a case where the contact parts 3a and 3b are at positions with and interpose one (odd number) nodal line of four nodal lines of tertiary bending vibration or three (odd number) nodal lines, or the like is also considered.

Hereinafter, a mode of the vibrator when an AC voltage having a phase difference is applied to the A phase 2a and the B phase 2b of the piezoelectric element 2 will be described referring to FIGS. 2 and 3.

Figure 2:
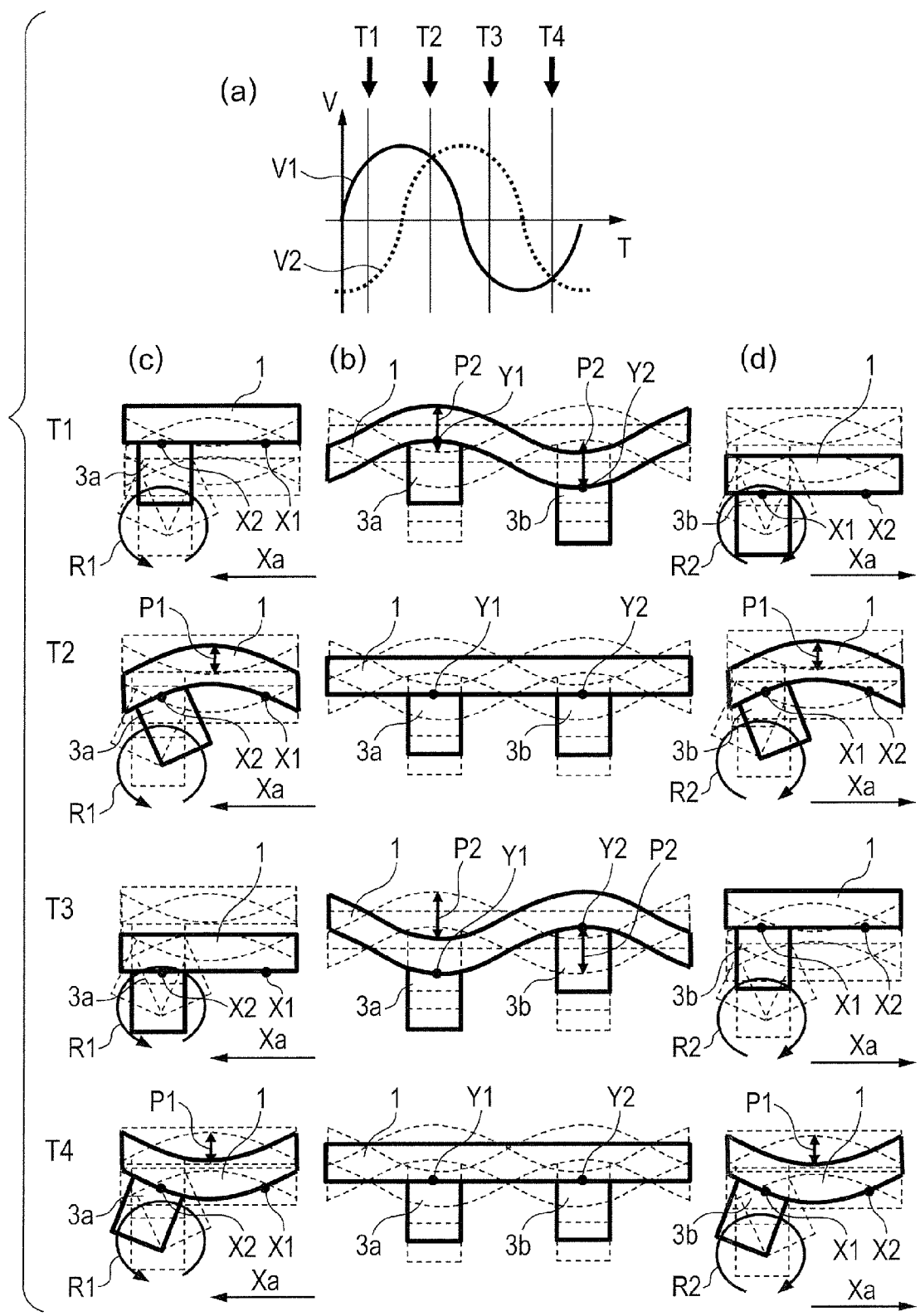
FIG. 2 is a diagram illustrating a model of speed control of the ultrasonic motor in the vibrator according to Embodiment 1 of the invention.

FIG. 2 models and illustrates a mode of the vibrator when an AC voltage is applied while delaying the phase of the B phase 2b by about +90° with respect to the A phase 2a of the piezoelectric element 2. The (a) of FIG. 2 illustrates changes in the AC voltage which is applied to the A phase 2a and the B phase 2b of the piezoelectric element 2, and in the (a) of FIG. 2, the vertical axis represents voltage and the horizontal axis represents time. A voltage V1 is applied to the A phase 2a, and a voltage V2 is applied to the B phase 2b. The (b) of FIG. 2 is a front view of the vibrator of FIG. 1A, the (c) of FIG. 2 is a left side view of the vibrator at the forming position of the left projection 3a on the vibrator, and the (d) of FIG. 2 is a right side view of the vibrator at the forming position of the right projection 3b on the vibrator. In the (b) to (d) of FIG. 2, state change in vibration of the vibrator at the time T1 to the time T4 of the (a) of FIG. 2 is indicated by a solid line in the (b) to (d) of FIG. 2, the piezoelectric element 2 and the holding parts 1a and 1b of the vibrator are omitted, and a dotted line indicates the state of the vibrator other than at the time represented by the solid line for comparison.

Figure 3:
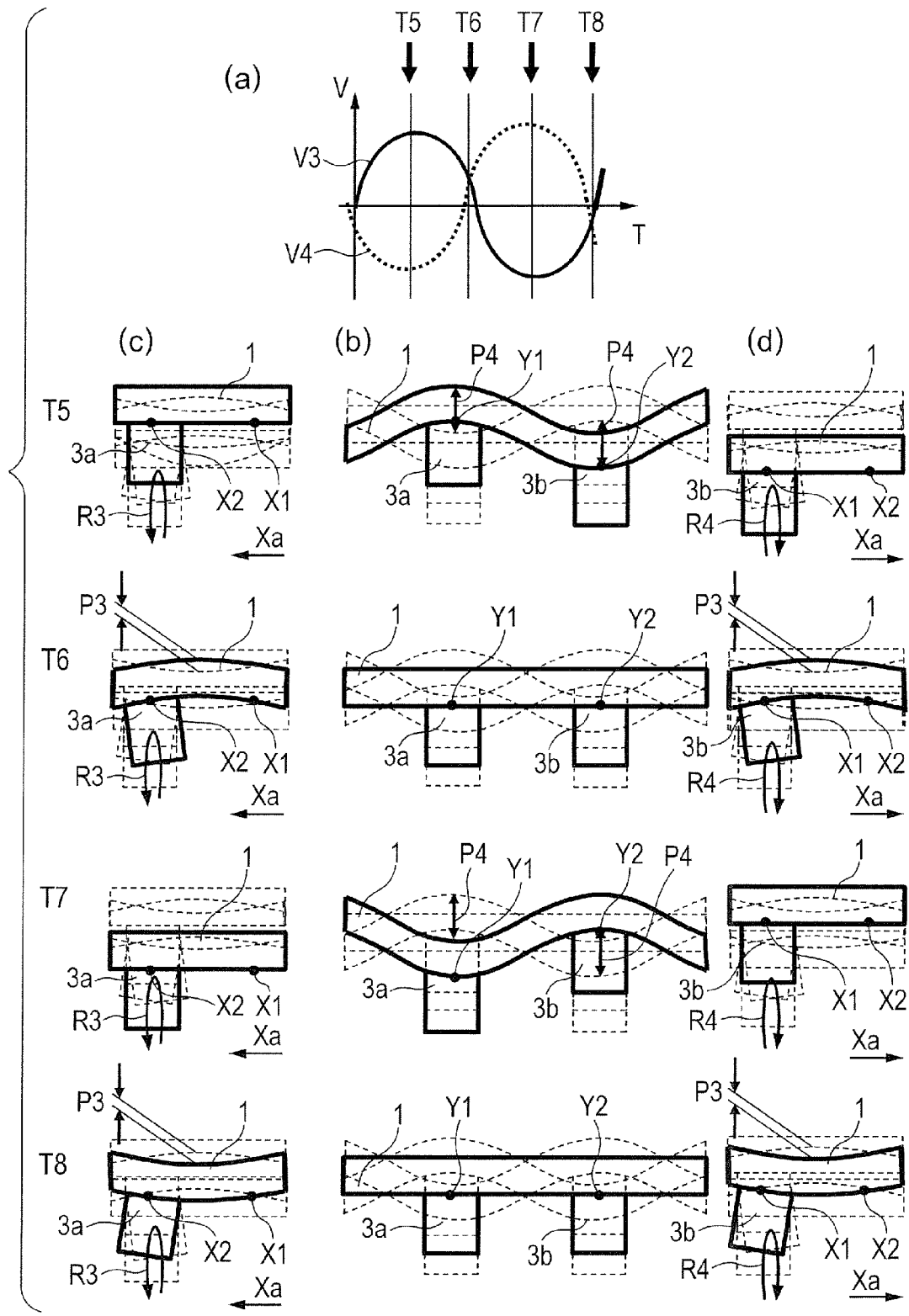
FIG. 3 is a diagram illustrating another model of speed control of the ultrasonic motor in the vibrator according to Embodiment 1 of the invention.

FIG. 3 models and illustrates a mode of the vibrator when an AC voltage is applied while delaying the phase of the B phase 2b by about +180° with respect to the A phase 2a of the piezoelectric element 2 of the vibrator. The (a) of FIG. 3 illustrates change in the AC voltage which is applied to the A phase 2a and the B phase 2b of the piezoelectric element 2, and in the (a) of FIG. 3, the vertical axis represents voltage and the horizontal axis represents time. A voltage V3 is applied to the A phase 2a, and a voltage V4 is applied to the B phase 2b. The (b) of FIG. 3 is a front view of the vibrator of FIG. 1A, the (c) of FIG. 3 is a left side view of the vibrator at the forming position of the left projection 3a of the vibrator, and the (d) of FIG. 3 is a right side view of the vibrator at the forming position of the right projection 3b on the vibrator. In the (b) to (d) of FIG. 3, state change in vibration of the vibrator at the time T5 to the time T8 of the (a) of FIG. 3 is indicated by a solid line. In the (b) to (d) of FIG. 3, the piezoelectric element 2 and the holding parts 1a and 1b of the vibrator are omitted, and a dotted line indicates the state of the vibrator other than at the time represented by the solid line.

As in FIG. 2, when an AC voltage is applied while delaying the phase of the B phase 2b by about +90° with respect to the A phase 2a of the piezoelectric element 2, at the time T2 and the time T4, as in the (a) of FIG. 2, voltages of the same sign having the same magnitude are applied to the A phase 2a and the B phase 2b. At this time, as in the (c) and (d) of FIG. 2, the A phase 2a and the B phase 2b the most expand and contract in the same direction within the same plane. The amplitude of the primary bending vibration generated in the direction along the shorter side of the vibration plate 1 becomes a maximum (P1). Accordingly, in the (c) and (d) of FIG. 2, this place corresponds to the antinode of the primary natural vibration mode of bending vibration generated in the direction along the shorter side of the vibration plate 1. The place where the projection 3a is arranged corresponds to the node X1 of the primary natural vibration mode of bending vibration generated in the direction along the shorter side of the vibration plate 1, and the place where the projection 3b is arranged corresponds to the node X2 of the primary natural vibration mode of bending vibration generated in the direction along the shorter side of the vibration plate 1.

At the time T1 and T3, as in the (a) of FIG. 2, voltages of different signs having the same magnitude are applied to the A phase 2a and the B phase 2b of the piezoelectric element 2. At this time, as in the (b) of FIG. 2, the A phase 2a and the B phase 2b the most expand and contract in opposite directions within the same plane. The amplitude of the secondary bending vibration generated in the direction along the longer side of the vibration plate 1 becomes a maximum (P2). Accordingly, as in the (b) of FIG. 2, the place where the projection 3a is arranged corresponds to the antinode Y1 of the secondary natural vibration mode of bending vibration generated in the direction along the longer side of the vibration plate 1, and the place where the projection 3b is arranged corresponds to the antinode Y2 of the secondary natural vibration mode of bending vibration generated in the direction along the longer side of the vibration plate 1.

As a result, since a circular motion R1 is generated at the distal end of the projection 3a, and a circular motion R2 is generated at the distal end of the projection 3b, the vibrator obtains a driving force to move in an Xa direction with respect to the friction member 21. When an AC voltage is applied while delaying the phase of the B phase 2b by about +270° with respect to the A phase 2a, circular motions in a direction opposite to the circular motions R1 and R2 are generated. With this, the vibrator obtains a driving force to move in a direction opposite to the Xa direction with respect to the friction member 21.

In this embodiment, a configuration in which the friction member 21 is fixed to an immovable fixed frame, and the vibrator moves along the friction member 21 has been described. However, the invention is not limited thereto, a configuration in which the vibrator is fixed to an immovable fixed frame, and the friction member 21 moves along the vibrator may be made. In this case, if the circular motion R1 is generated at the distal end of the projection 3a, and the circular motion R2 is generated at the distal end of the projection 3b, the friction member 21 obtains a driving force to move in a direction opposite to the Xa direction with respect to the vibrator. If the phase difference of the AC voltage which is applied to the A phase 2a and the B phase 2b of the piezoelectric element 2 changes and circular motions in a direction opposite to the circular motions R1 and R2 are generated at the distal ends of the projections 3a and 3b, the friction member 21 obtains a driving force to move in the Xa direction with respect to the vibrator.

As in FIG. 3, when an AC voltage is applied while delaying the phase of the B phase 2b by about +180° with respect to the A phase 2a of the piezoelectric element 2, at the time T1 and the time T7, as in the (a) of FIG. 3, voltages of different signs having the same magnitude are applied to the A phase 2a and the B phase 2b of the piezoelectric element 2. At this time, as in the (b) of FIG. 3, the amplitude of the secondary bending vibration generated in the direction along the longer side of the vibration plate 1 becomes a maximum (P4). Accordingly, in the (b) of FIG. 3, the place where the projection 3a is arranged corresponds to the antinode Y1 of the secondary natural vibration mode of bending vibration generated in the direction along the longer side of the vibration plate 1, and the place where the projection 3b is arranged corresponds to the antinode Y2 of the secondary natural vibration mode of bending vibration generated in the direction along the longer side of the vibration plate 1.

At the time T6 and the time T8, compared to a case where the phase of the B phase 2b is delayed by +90° with respect to the A phase 2a of the piezoelectric element 2 (FIG. 2), as in the (a) of FIG. 3, the time when voltages of the same sign are applied between the A phase 2a and the B phase 2b of the piezoelectric element 2 is very short. Accordingly, as in the (c) and (d) of FIG. 3, the amplitude of the primary bending vibration generated in the direction along the shorter side of the vibration plate 1 becomes very small (P3). Therefore, as in the (c) and (d) of FIG. 3, this place corresponds to the antinode of the primary natural vibration mode of bending vibration generated in the direction along the shorter side of the vibration plate 1. The place where the projection 3a is arranged corresponds to the node X1 of the primary natural vibration mode of bending vibration generated in the direction along the shorter side of the vibration plate 1, and the place where the projection 3b is arranged corresponds to the node X2 of the primary natural vibration mode of bending vibration generated in the direction along the shorter side of the vibration plate 1.

As a result, a longitudinal elliptic motion R3 is generated at the distal end of the projection 3a, and a circular motion R4 is generated at the distal end of the projection 3b. Since the elliptic motions R3 and R4 have a moving distance in the Xa direction shorter than the circular motions R1 and R2, the vibrator can move in the Xa direction at low speed with respect to the friction member 21. Similarly to the circular motions R1 and R2, the elliptic motions R3 and R4 may be reversed by changing the phase difference of the voltage between the A phase 2a and the B phase 2b of the piezoelectric element 2, and in this case, the vibrator obtains a driving force to move at low speed in a direction opposite to the Xa direction with respect to the friction member 21.

In this embodiment, a configuration in which the friction member 21 is fixed to an immovable fixed frame, and the vibrator moves along the friction member 21 has been described. However, the invention is not limited thereto, a configuration in which the vibrator is fixed to an immovable fixed frame, and the friction member 21 moves along the vibrator may be made. In this case, if the elliptic motion R3 is generated at the distal end of the projection 3a, and the elliptic motion R4 is generated at the distal end of the projection 103b, the friction member 21 obtains a driving force to move in a direction opposite to the Xa direction at low speed with respect to the vibrator. If the phase difference of the AC voltage which is applied to the A phase 2a and the B phase 2b of the piezoelectric element 2 changes and circular motions in a direction opposite to the elliptic motions R3 and R4 are generated at the distal ends of the projections 3a and 3b, the friction member 21 obtains a driving force to move in the Xa direction at low speed with respect to the vibrator.

As described above, in the ultrasonic motor of this embodiment, the vibrator can move in the direction along the shorter side of the vibration plate 1 with respect to the friction member 21 with a simple configuration of the piezoelectric element.

In this embodiment, the projection 3a is arranged at the place of one node X2 of the primary natural vibration mode of bending vibration excited by the piezoelectric element 2 and generated in the direction along the shorter side of the vibration plate 1. The projection 3a is arranged at the place of one antinode Y1 of the secondary natural vibration mode of bending vibration generated in the direction along the longer side of the vibration plate 1. The projection 3b is arranged at the place of the other node X1 of the primary natural vibration mode of bending vibration generated in the direction along the shorter side of the vibration plate 1. The projection 3b is arranged at the place of the other antinode Y2 of the secondary natural vibration mode of bending vibration generated in the direction along the longer side of the vibration plate 1. With this, the vibrator moves in the direction along the shorter side of the vibration plate 1 with respect to the friction member 21. Although the largest driving force is generated at these places, the arrangement of the projections is not limited thereto.

The projection 3a may be arranged at a place nearer one node X2 than the antinode of the primary natural vibration mode of bending vibration generated in the direction along the shorter side of the vibration plate 1. The projection 3a may be also arranged at a place nearer the antinode Y1 than one node nearby the antinode Y1 on the side of the shorter side of the secondary natural vibration mode of bending vibration generated in the direction along the longer side of the vibration plate 1. The projection 3b may be arranged at a place nearer the other node X1 than the antinode of the primary natural vibration mode of bending vibration generated in the direction along the shorter side of the vibration plate 1. The projection 3b may be arranged at a place nearer the antinode Y2 than the other node nearby the antinode Y2 on the side of the shorter side of the secondary natural vibration mode of bending vibration generated in the direction along the longer side of the vibration plate 1. Although the driving force decreases as the arrangement place of the projection 3a is shifted from the node X2 and the antinode Y1 of the vibration plate 1 or as the arrangement place of the projection 3b is shifted from the node X1 and the antinode Y2 of the vibration plate 1, the vibrator can obtain a driving force to move in the direction along the shorter side of the vibration plate with respect to the friction member 21. That is, this becomes "the place of one antinode" or "the place nearer one antinode than a node on the shorter side nearest one antinode" in the secondary natural vibration mode. This means that the projection is arranged at "the place of one node" or "the place nearer one node than an antinode" in the primary natural vibration mode.

In this embodiment, although the two projections 3a and 3b are arranged on the vibration plate 1, only one of the projections 3a and 3b may be arranged on the vibration plate 1. When only one of the projections 3a and 3b is arranged on the vibration plate 1, while the driving force decreases compared to a case where the two projections 3a and 3b are arranged, the vibrator can obtain a driving force to move in the direction along the shorter side of the vibration plate with respect to the friction member 21.

Subsequent, a specific example of this embodiment will be described referring to FIGS. 4A, 4B, and 5A to 5C.

Figure 4A:
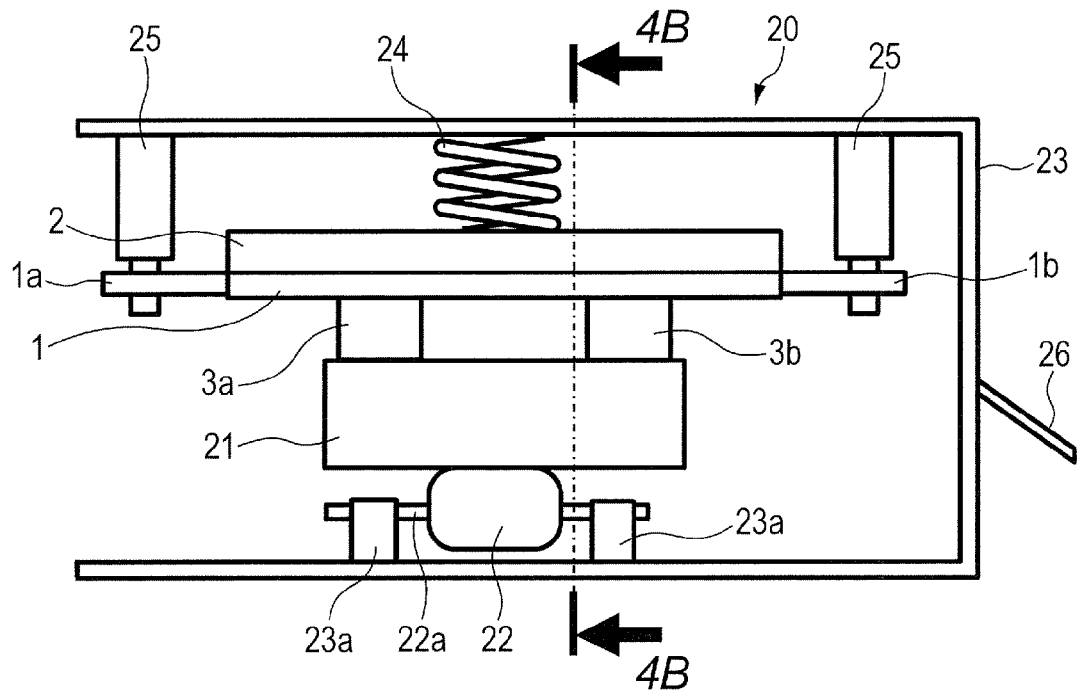
FIG. 4A is a diagram illustrating a configuration of a linear driving apparatus which uses the ultrasonic motor having the vibrator according to Embodiment 1 of the invention.
Figure 4B:
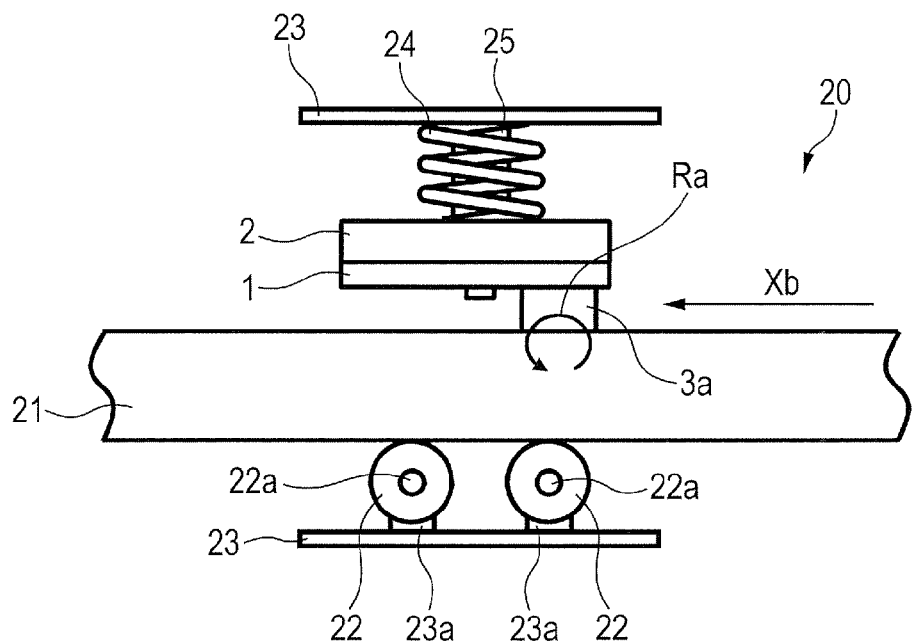
FIG. 4B is a partial sectional view of the configuration of the linear driving apparatus of FIG. 4A.

FIGS. 4A and 4B are schematic views of a linear driving apparatus 20 which uses the ultrasonic motor having the vibrator of this embodiment. FIG. 4A is a diagram when viewed from the moving direction of the vibrator with respect to the friction member 21 in the ultrasonic motor, and FIG. 4B is a sectional view taken along the line 4B-4B of FIG. 4A.

Figure 5A:
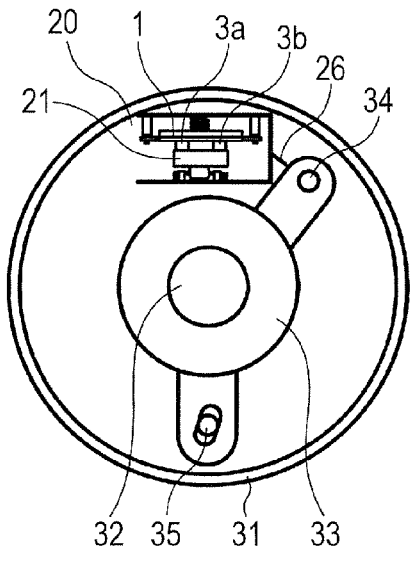
FIG. 5A is a front view illustrating a configuration of a lens driving apparatus which uses the linear driving apparatus of FIG. 4A.
Figure 5B:
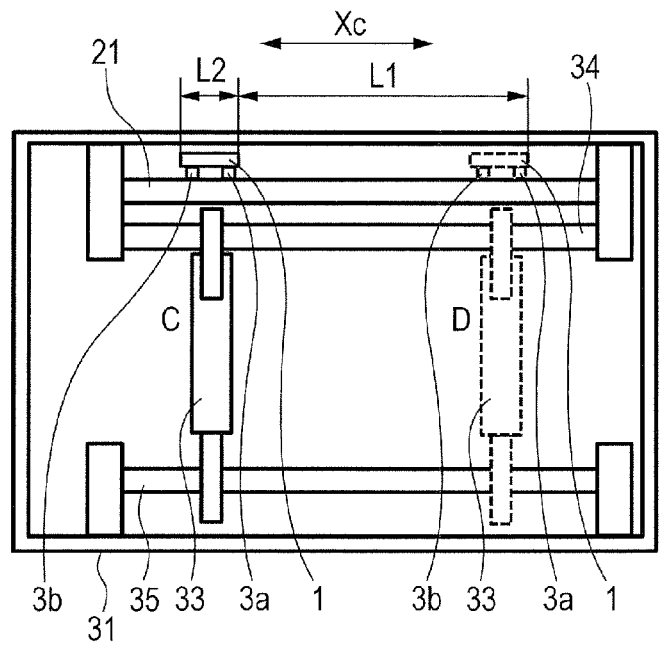
FIG. 5B is an internal side view illustrating a configuration of a lens driving apparatus which uses the linear driving apparatus of FIG. 4A when a full length in an optical axis direction is long.
Figure 5C:
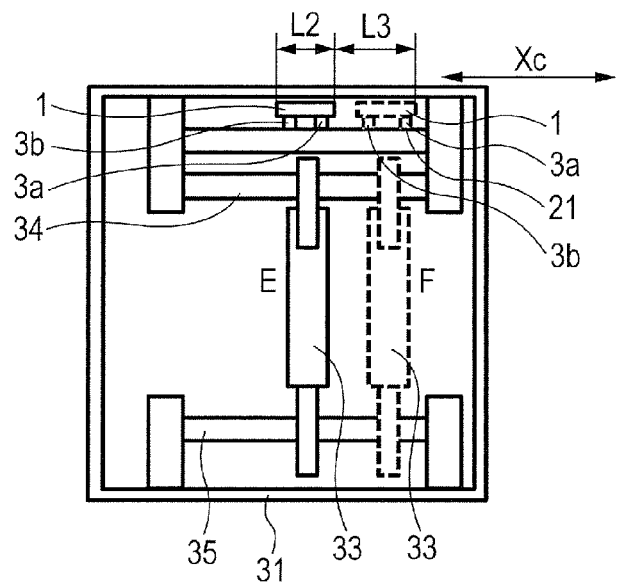
FIG. 5C is an internal side view illustrating a configuration of a lens driving apparatus which uses the linear driving apparatus of FIG. 4A when a full length in an optical axis direction is short.
Figure 8A:
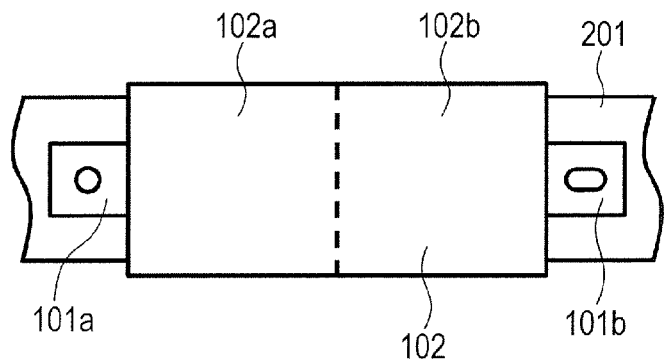
FIG. 8A is a plan view illustrating a configuration of a vibrator of an ultrasonic motor of the related art.
Figure 8C:
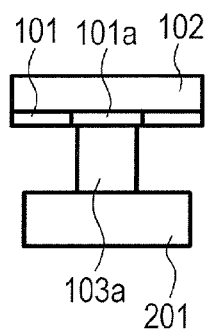
FIG. 8C is a left side view illustrating the configuration of the vibrator of the ultrasonic motor of FIG. 8A.
Figure 8B:
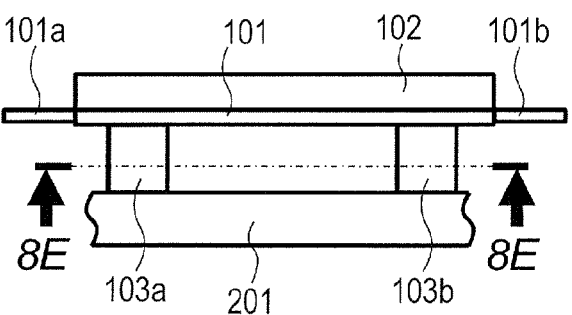
FIG. 8B is a front view illustrating the configuration of the vibrator of the ultrasonic motor of FIG. 8A.
Figure 8D:
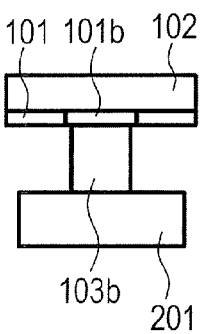
FIG. 8D is a right side view illustrating the configuration of the vibrator of the ultrasonic motor of FIG. 8A.
Figure 8E:
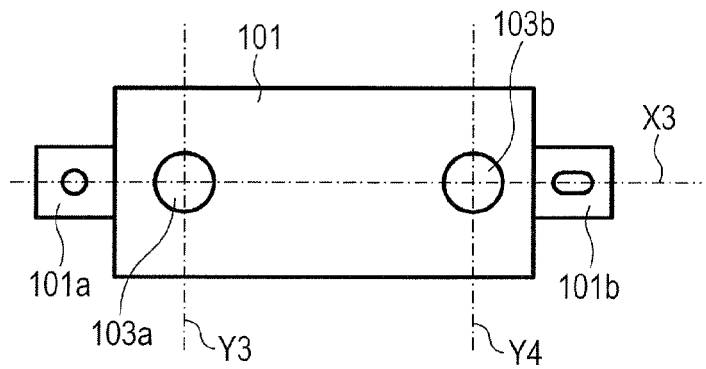
FIG. 8E is a partial sectional view illustrating the configuration of the vibrator of the ultrasonic motor of FIG. 8A.
Figure 9:
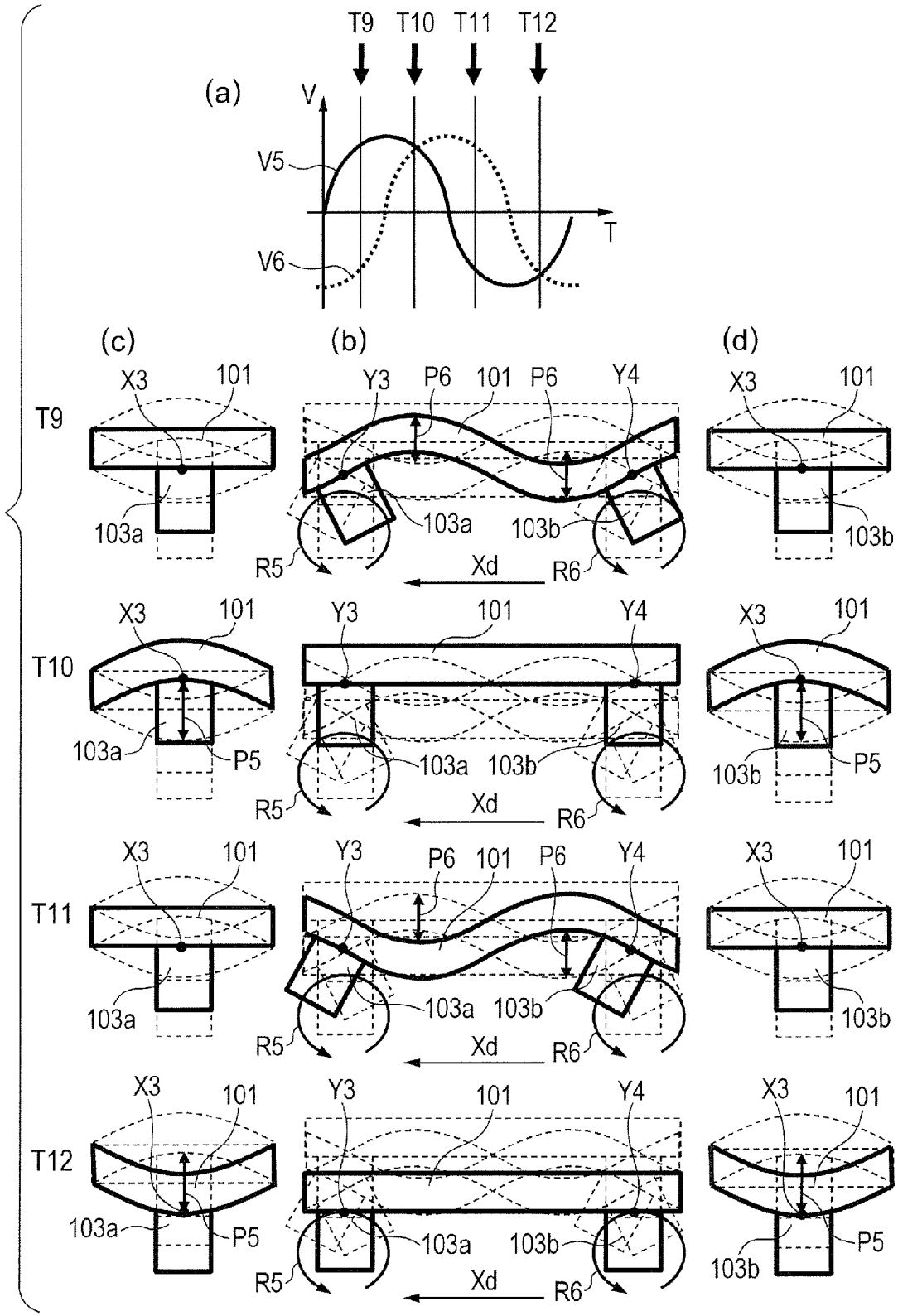
FIG. 9 is a diagram illustrating a model of speed control of the ultrasonic motor Which has the vibrator of the related art.
Figure 10:
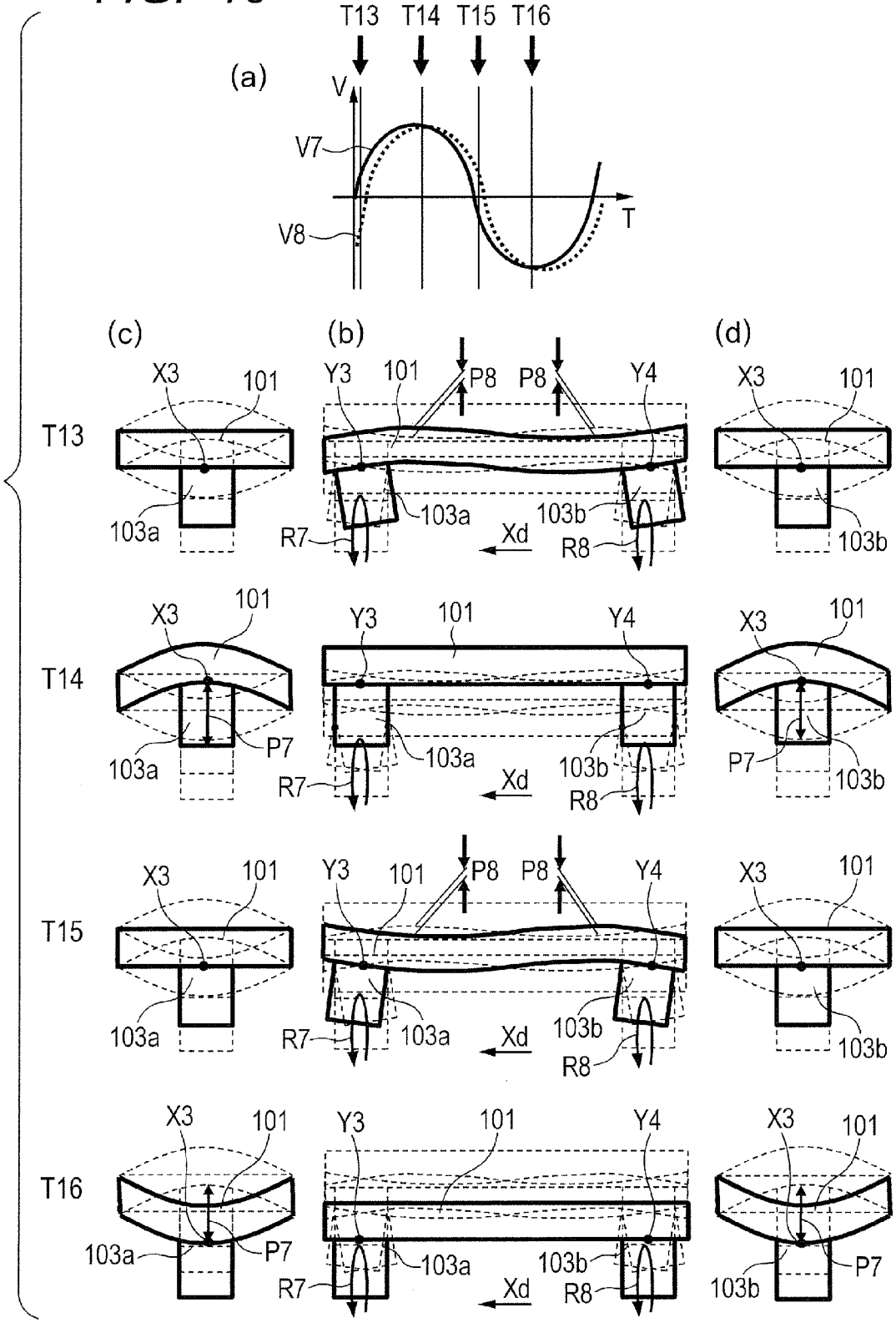
FIG. 10 is a diagram illustrating another model of speed control of the ultrasonic motor which has the vibrator of the related art.
Figure 11A:
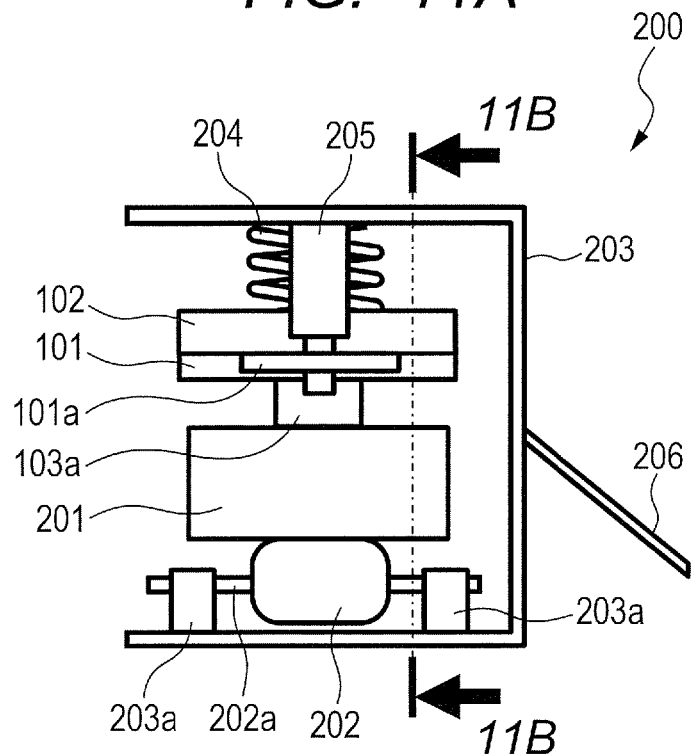
FIG. 11A is a diagram illustrating a configuration of a linear driving apparatus using an ultrasonic motor having a vibrator of the related art.
Figure 11B:
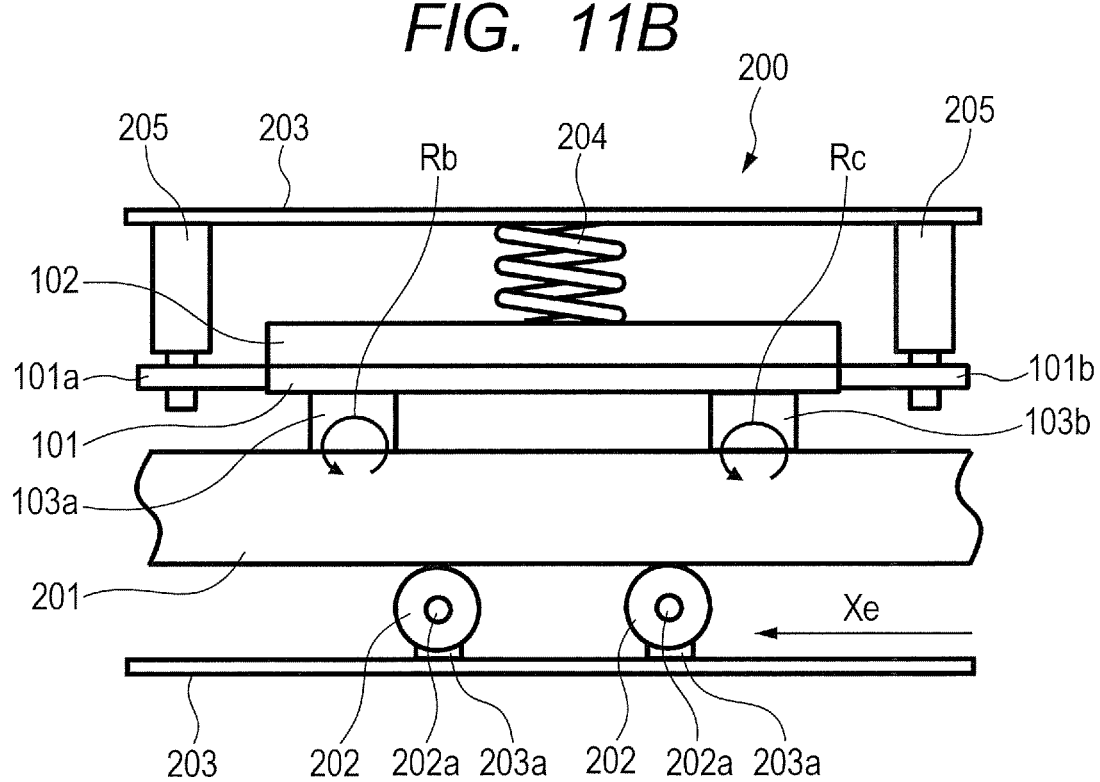
FIG. 11B is a partial sectional view illustrating the configuration of the linear driving apparatus of FIG. 11A.
Figure 12A:
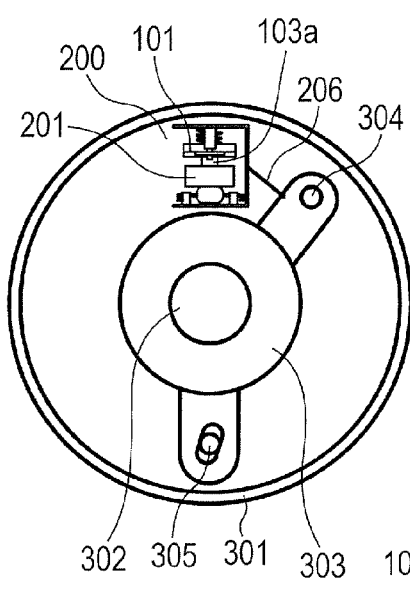
FIG. 12A is a diagram illustrating a configuration of the lens driving apparatus which uses the linear driving apparatus of the related art.
Figure 12B:
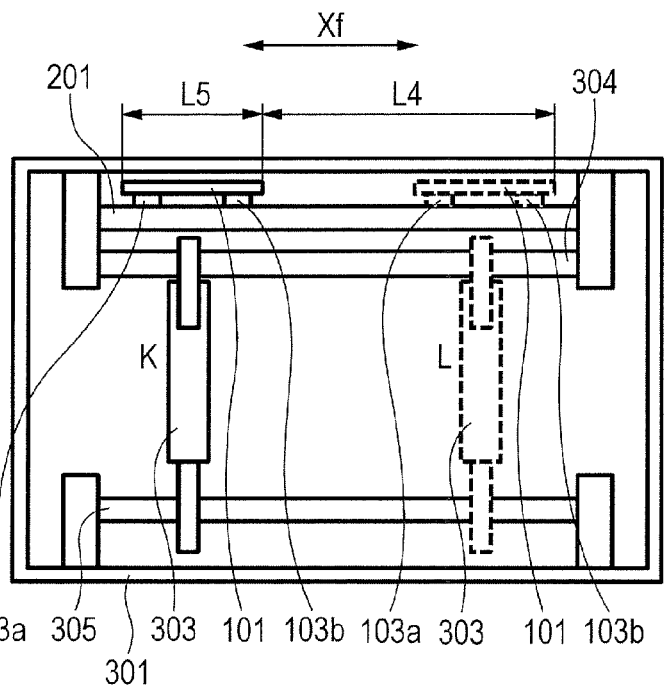
FIG. 12B is a diagram illustrating a configuration of the lens driving apparatus which uses the linear driving apparatus of the related art when a full length in an optical axis direction is long.
Figure 12C:
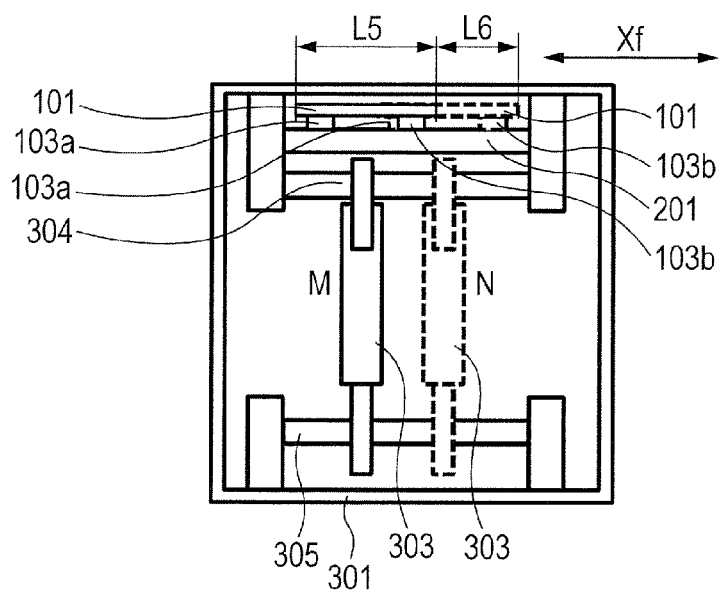
FIG. 12C is a diagram illustrating a configuration of the lens driving apparatus which uses the linear driving apparatus of the related art when a full length in an optical axis direction is short.

FIGS. 5A to 5C are schematic views of a lens driving apparatus in which the linear driving apparatus 20, which uses the ultrasonic motor having the vibrator of this embodiment is mounted. FIG. 5A is a front view when a lens apparatus is viewed from an optical axis direction of the lens driving apparatus, FIG. 5B is an internal side view of the inside of the lens driving apparatus when the full length in the optical axis direction of the lens driving apparatus is long, and FIG. 5C is an internal side view of the inside of the lens driving apparatus when the full length in the optical axis direction of the lens driving apparatus is short.

The linear driving apparatus 20 has the vibrator having the vibration plate 1 and the piezoelectric element 2 of this embodiment, and the projections 3a and 3b. The linear driving apparatus further has an friction member 21 fixed to an immovable fixed frame (not shown), a roller 22, a roller support shaft 22a, a frame body 23 as a retention member, and a roller support part 23a which is retained by the frame body 23. The linear driving apparatus further has a pressurization spring 24, holding pins 25 which are retained by the frame body 23, and a driving transmission member 26 which is fixed to the frame body 23.

The lens driving apparatus has the linear driving apparatus 20, an outer frame 31 as an immovable fixed frame, a lens 32, a lens holder 33 which is connected to the driving transmission member 26 to retain the lens 32, and guide bars 34 and 35. In FIGS. 5B and 5C, in order to clarify the position relationship of the vibration plate 1 with respect to the size of the lens driving apparatus, in the linear driving apparatus 20, other parts than the vibration plate 1 and the projections 3a and 3b are omitted.

In the linear driving apparatus 20, the holding pins 25 are fitted into the holes of the holding parts 1a and 1b of the vibration plate, and the vibrator is supported by the frame body 23. A rolling member has a configuration in which the roller 22 is retained by the roller support part 23a through the roller support shaft 22a. The rolling member is supported by the frame body 23. The sliding surface of the roller 22 of the rolling member is in contact with the friction member 21 fixed to the outer frame 31 of the lens driving apparatus. The roller 22 of the rolling member is provided to reduce sliding resistance during driving, and may be a mechanism, such as a rolling roller. The pressurization spring 24 has a lower end in contact with the piezoelectric element 2 of the vibrator and an upper end in contact with the frame body 23, and is sandwiched between the piezoelectric element 2 and the frame body 23 to give a pressurization force. The vibrator has a free motion in the central axis direction of the pressurization spring 24, and the projections 3a and 3b are in contact with the surface of the friction member 21 opposite to a roller contact surface. Accordingly, the projections 3a and 3b are pressurized and brought into contact with the friction member 21 by the pressurization force of the pressurization spring 24. With a circular motion (or elliptic motion) Ra generated in the projection 3a and a circular motion (or elliptic motion) (not shown) generated in the projection 3b in the same rotational direction as the circular motion Ra, the vibrator obtains a driving force to move in an Xb direction with respect to the friction member 21. As described above, if the phase difference of the AC voltage which is applied to the A phase 2a and the B phase 2b of the piezoelectric element 2 changes, since a circular motion in a direction opposite to the circular motion Ra is generated in the projection 3a, and similarly, a circular motion in an opposite direction is generated in the projection 3b, the vibrator obtains a driving force to move in a direction opposite to the Xb direction with respect to the friction member 21.

In the linear driving apparatus 20 which uses the ultrasonic motor having the vibrator of this embodiment, the vibrator can move in the direction along the shorter side of the vibrator with respect to the friction member 21 with a simple configuration of the piezoelectric element.

In the linear driving apparatus which uses the ultrasonic motor having the vibrator of this embodiment, a configuration in which the friction member 21 is fixed and the vibrator moves along the friction member 21 has been described. However, the invention is not limited thereto, and even in a configuration in which the vibrator is fixed and the friction member 21 moves along the vibrator, the friction member 21 can obtain a driving force to move in the direction along the shorter side of the vibration plate with respect to the vibrator. The driving force is the same as the driving force when the vibrator moves with respect to the friction member 21.

With the above-described configuration, the linear driving apparatus 20 can achieve reduction in size of the apparatus in the moving direction of the vibrator with respect to the friction member 21. Therefore, when the configuration is applied to an apparatus which requires reduction in size in the moving direction of the vibrator with respect to the friction member 21, this significantly contributes to reduction in size of the entire apparatus.

In the lens driving apparatus, the guide bars 34 and 35 and the friction member 21 have both ends fixed to the outer frame 31 to extend in the optical axis direction of the lens driving apparatus. The lens holder 33 is connected to the driving transmission member 26 of the linear driving apparatus 20, and is supported by the guide bars 34 and 35 and guided, thereby moving in an optical axis direction Xc of a lens apparatus. The linear driving apparatus 20 moves at a considerable distance according to a movement command from a control unit (not shown), thereby moving the lens holder 33. Referring to FIG. 5B, in the lens driving apparatus, the vibration plate 1 of the vibrator moves within a range of a product of a lens holder moving distance L1 between one movable end C and the other movable end D of the lens holder 33 and a vibration plate length L2, which is the length in the moving direction of the vibration plate 1. Since L2 is the length of the shorter side of the vibration plate 1, the lens holder moving distance L1 is sufficiently greater than the vibration plate length L2. Accordingly, referring to FIG. 5C, even when the lens holder moving distance changes to the lens holder moving distance L3 smaller than the lens holder moving distance L1 between one movable end E and the other movable end F of the lens holder 33, the lens holder moving distance L3 can be made to be sufficiently greater than the vibration plate length L2.

In the lens driving apparatus which uses the ultrasonic motor having the vibrator of this embodiment, the friction member 21 is fixed to the outer frame 31, and the lens holder 33 connected to the vibrator is movable along the friction member 21. However, the invention is not limited thereto, and even in a configuration in which the vibrator is fixed to the outer frame 31, and the lens holder 33 connected to the friction member 21 is movable along the vibrator, the friction member 21 can obtain a driving force to move in a direction along the shorter side of the vibration plate with respect to the vibrator. The driving force is the same as the driving force when the vibrator moves with respect to the friction member 21.

The above-described configuration significantly contributes to reduction in size of the entire lens apparatus. In particular, in the lens driving apparatus, since there is a strong demand for reduction in size in the optical axis direction Xc, the configuration significantly contributes to reduction in size of the entire lens driving apparatus.

Embodiment 2

Subsequently, Embodiment 2 of the invention will be described referring to FIGS. 6A to 6E.

In Embodiment 1, the projections 3a and 3b are formed in the vibration plate 1. However, even if the projections are arranged on the piezoelectric element 2, the same effects are obtained.

FIGS. 6A to 6E are diagrams illustrating the configuration of a vibrator of an ultrasonic motor as a driving apparatus according to Embodiment 2 of the invention. FIG. 6A is a plan view, FIG. 6B is a front view of FIG. 6A, FIG. 6C is a left side view of FIG. 6A, FIG. 6D is a right side view of FIG. 6A, and FIG. 6E is a sectional view taken along the line 6E-6E of FIG. 6B.

In the vibrator of FIGS. 6A to 6E, two projections 3c and 3d are arranged on the piezoelectric element 2 by bonding or the like, compared to Embodiment 1.

The projection 3c is arranged at a place of one node X2 of a primary natural vibration mode of bending vibration excited by the piezoelectric element 2 and generated in the direction along the shorter side of the vibration plate 1. The projection 3c is also arranged at a place of one antinode Y1 of a secondary natural vibration mode of bending vibration excited by the piezoelectric element 2 and generated in the direction along the longer side of the vibration plate 1. The projection 3d is arranged at a place of the other node X1 of the primary natural vibration mode of bending vibration generated in the direction along the shorter side of the piezoelectric element 2. The projection 3d is also arranged at a place of the other node Y2 of the secondary natural vibration mode of bending vibration generated in the direction along the longer side of the vibration plate 1.

In this embodiment, since the projections have the same arrangement configuration as in Embodiment 1, the same effects as in Embodiment 1 are obtained.

Embodiment 3

Subsequently, Embodiment 3 of the invention will be described referring to FIGS. 7A to 7E.

In Embodiment 1, a configuration in which the holding parts 1a and 1b are provided on the shorter sides of the vibration plate 1 is made. However, even if the holding parts are provided on the longer sides of the vibration plate 1, the same effects are obtained.

FIGS. 7A to 7E are diagrams illustrating the configuration of a vibrator of an ultrasonic motor as a driving apparatus according to Embodiment 3 of the invention. FIG. 7A is a plan view, FIG. 7B is a front view of FIG. 7A, FIG. 7C is a left side view of FIG. 7A, FIG. 7D is a right side view of FIG. 7A, and FIG. 7E is a sectional view taken along the line 7E-7E of FIG. 7B.

The vibrator of FIGS. 7A to 7E has the holding parts 1c and 1d provided on the longer sides of the vibration plate 1 compared to Embodiment 1.

In this embodiment, since only a configuration for holding the vibrator to the frame body is changed compared to Embodiment 1, it is possible to realize the same actions as in Embodiment 1.

Since it is possible to realize the same arrangement of the projections and the same natural vibration modes of bending vibration as in Embodiment 1, the configurations of Embodiment 2 and Embodiment 3 may be combined.

Although the preferred embodiments of the invention have been described, the invention is not limited to these embodiments, and various modifications and alterations may be made without departing from the spirit and scope of the invention. Although a case where the ultrasonic motor of this embodiment is a linear driving ultrasonic motor which is united as a driving actuator of a lens barrel for a digital camera has been described as an example, the purpose of use is not limited thereto. For example, even if the invention is applied to a rotating ultrasonic motor, the same effects can be obtained.

INDUSTRIAL APPLICABILITY

The invention can be used in an electronic apparatus which is small and lightweight, and which requires a wide driving speed range, and can be used particularly in a lens driving apparatus or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-144277, filed Jul. 10, 2013, and Japanese Patent Application No. 2014-135845, filed Jul. 1, 2014, which are hereby incorporated by reference herein in their entirety.

REFERENCE SIGNS LIST

1: vibration plate
2: piezoelectric element
21: friction member
23: frame body
24: pressurization spring
3a: projection
3b: projection
3c: projection
3d: projection
31: outer frame
32: lens
33: lens holder

The invention claimed is:

1. A driving apparatus comprising:
a vibration plate;
a vibrator having a piezoelectric element, a first contact part and a second contact part, the piezoelectric element exciting vibration of the vibration plate; and
a friction member being in contact with the first contact part and the second contact part, wherein the vibrator and the friction member relatively move with respect to each other, and the first contact part and the second contact part are provided at positions with and interpose an odd number of antinodal lines of vibration generated in a first direction of the vibrator along with excitation, and provided at positions with and interpose an odd number of nodal lines of vibration generated in a second direction of the vibrator along with excitation.

2. The driving apparatus according to claim 1, wherein the vibrator and the friction member relatively move with respect to each other in the first direction.

3. The driving apparatus according to claim 1, wherein the vibration plate includes a shorter side and a longer side, the first direction corresponds to a direction along the shorter side of the vibration plate, and the second direction corresponds to a direction along the longer side of the vibration plate.

4. The driving apparatus according to claim 1, wherein the first contact part and the second contact part are provided at opposite positions with and interpose an antinodal line of primary bending vibration generated in the first direction of the vibrator, and provided at different positions in a direction along the second direction other than positions of nodal lines of secondary bending vibration in the second direction.

5. The driving apparatus according to claim 1, wherein the first direction the second direction are orthogonal to each other.

6. The driving apparatus according to claim 1, wherein the first contact part and the second contact part are provided at places of one antinode of the secondary bending vibration or at places nearer the one antinode than a node on the shorter side nearest the one antinode.

7. The driving apparatus according to claim 1, wherein the first contact part and the second contact part are provided at places of one node of the primary bending vibration or places nearer the one node than an antinode.

8. The driving apparatus according to claim 7, wherein the first contact part and the second contact part are formed integrally with the vibration plate.

9. The driving apparatus according to claim 1, wherein the first contact part and the second contact part are arranged on the vibration plate or the piezoelectric element.

10. The driving apparatus according to claim 1, wherein the vibrator is retained on the longer side or the shorter side of the vibration plate.

11. The driving apparatus according to claim 1, further comprising:
a retention member retaining the vibrator and having a rolling member,
wherein the friction member abuts on the retention member through the rolling member.

12. The driving apparatus according to claim 1, wherein the friction member is fixed, and the vibrator moves with respect to the friction member.

13. The driving apparatus according to claim 1,
wherein the vibrator is fixed, and the friction member moves with respect to the vibrator.

14. A lens driving apparatus comprising:
a driving apparatus; and
a lens holder retaining a lens,
wherein the driving apparatus comprising:
a vibration plate;
a vibrator having a piezoelectric element, a first contact part and a second contact part, the piezoelectric element exciting vibration of the vibration plate; and
a friction member being in contact with the first contact part and the second contact part,
wherein the vibrator and the friction member relatively move with respect to each other, and the first contact part and the second contact part are provided at positions with and interpose an odd number of antinodal lines of vibration generated in a first direction of the vibrator along with excitation, and provided at positions with and interpose an odd number of nodal lines of vibration generated in a second direction of the vibrator along with excitation,
wherein the friction member is fixed, and the vibrator moves with respect to the friction member,
wherein the lens holder is connected to the vibrator and held movably with respect to the friction member, and the lens holder moves with respect to the friction member to allow the lens to be moved.

15. A lens driving apparatus comprising:
a driving apparatus;
a lens holder retaining a lens,
wherein the driving apparatus comprising:
a vibration plate;
a vibrator having a piezoelectric element, a first contact part and a second contact part, the piezoelectric element exciting vibration of the vibration plate; and
a friction member being in contact with the first contact part and the second contact part,
wherein the vibrator and the friction member relatively move with respect to each other, and the first contact part and the second contact part are provided at positions with and interpose an odd number of antinodal lines of vibration generated in a first direction of the vibrator along with excitation, and provided at positions with and interpose an odd number of nodal lines of vibration generated in a second direction of the vibrator along with excitation,
wherein the vibrator is fixed, and the friction member moves with respect to the vibrator,
wherein the lens holder is connected to the friction member and held movably with respect to the vibrator, and the lens holder moves with respect to the vibrator to allow the lens to be moved.

16. A vibrator comprising:

a vibration plate;

a piezoelectric element exciting vibration of the vibration plate; and a first contact part and a second contact part, the first contact part and the second contact part being formed as convex shape parts, wherein the first contact part and the second contact part are provided at opposite positions with and interpose an antinodal line of a bending primary resonance frequency in a direction along a shorter side, and provided at different positions in a direction along a longer side other than a nodal line of a bending secondary resonance frequency in the direction along the longer side, and the bending primary resonance frequency and the bending secondary resonance frequency are a resonance frequency of natural vibration, and match each other or are adjacent to each other.

17. The vibrator according to claim 16, wherein there is no resonance frequency of a different vibration mode between the bending primary resonance frequency in the direction along the shorter side and the bending secondary resonance frequency in the direction along the longer side.

18. The vibrator according to claim 16, wherein the first contact part and the second contact part are provided at places of one antinode of bending secondary vibration or at positions nearer the one antinode than a node on the shorter side nearest the one antinode.

19. The vibrator according to claim 16, wherein the first contact part and second contact part are provided at places of one node of bending primary vibration or at places nearer the one node than an antinode.

20. The vibrator according to claim 16, wherein the first contact part and the second contact part are formed integrally with the vibration plate.

21. The vibrator according to claim 16, wherein the first contact part and second contact part are arranged on the vibration plate or the piezoelectric element.

22. The vibrator according to claim 16, wherein the vibrator is retained on the longer side or the shorter side of the vibration plate.

\* \* \* \* \*